Nov. 7, 1972     L. J. PAGE     3,702,217

OPHTHALMIC MOUNTING FOR TENSIONALLY SECURING LENSES THERETO

Filed May 20, 1971

Louis J. Page
INVENTOR

United States Patent Office 3,702,217
Patented Nov. 7, 1972

3,702,217
OPHTHALMIC MOUNTING FOR TENSIONALLY
SECURING LENSES THERETO
Louis J. Page, New York, N.Y.
(191—21 Hillside Ave., Hollis, N.Y. 11423)
Filed May 20, 1971, Ser. No. 145,447
Int. Cl. G02c 1/02
U.S. Cl. 351—106  3 Claims

ABSTRACT OF THE DISCLOSURE

An ophthalmic mounting for tensionally securing lenses thereto by means which comprises rim members having adjustable arms attached thereto, said arms extending rearwardly from said rim members and redirected forwardly forming a loop, the forward portion of the arms being bent over to engage the front surface of the lens, said arms being adjustable up, down, in or out relative to the rim member so that inaccuracies in preparing the lenses for mounting can be compensated for.

---

This invention relates to ophthalmic mountings for tensionally securing lenses thereto, and particularly to the type in which the lenses are provided with a notch in each of the side edges and the lenses are attached to the mounting by means of arms engaging the notches in the lenses. Such mountings have the common fault that the notches must be exactly placed and formed or the rim member will be out of alignment (below or above) with the corresponding edge portion of the lens attached thereto, making for an unacceptable pair of eyeglasses. The exact positioning of the notches in the lenses is very difficult since there are a number of variables such as the following: the lateral curve of the lens effects the apparent distance between the notches in the lens, the chart which is used to mark for the location of the notch in the lens does not take this into consideration, the positioning of the lens on the chart is subject to error in judgement, the grinding of the position of the notch in the lens is subject to error, the depth of the notch is subject to error. Another fault or disadvantage of this type of mounting is that when the prescription for the lenses need changing and thicker lenses are called for, the arms which engage the notches in the lenses are not long enough to accommodate the new thicker lenses, the mounting must be discarded. Another disadvantage of this type of mounting is that when the mounting is accidentally hit, mishandled, dropped or abused the stress is aborbed by the lenses since the arms engaging the notches in the lenses are attached to the supporting rim member so that there is no relative movement or flexibility between the arms and the supporting rim member.

The object of my invention is to overcome these faults and disadvantages. Usually the arms are attached to the rim member and extend forwardly therefrom to engage the notches in the lens. In my invention the arms are attached to the rim member extending rearwardly and then redirected forwardly in a gooseneck formation whereby the arms may be plier bent so that the portion of the arms engaging the notches in the lens may be raised, lowered, moved forward or rearward relative to the rim member. Since the arms can be adjusted relative to the rim member, lenses having the notches incorrectly located therein or lenses which are thicker than the arms were originally formed to accommodate can be accurately mounted so that the edge portion of the lens is in alignment relative to the rim member and lenses of different thickness can be mounted therein. In addition any stress transmitted to the lenses by the arms engaging the notches in the lenses is absorbed by the arms since the gooseneck formation of the arms allows the arms to flex relative to the supporting rim member.

These and other objects and advantages of my invention reside in the novel arrangement of the parts and features of construction which will be more fully understood from the accompanying drawing and the following description and claims.

Referring to the drawing.

Figure 1:
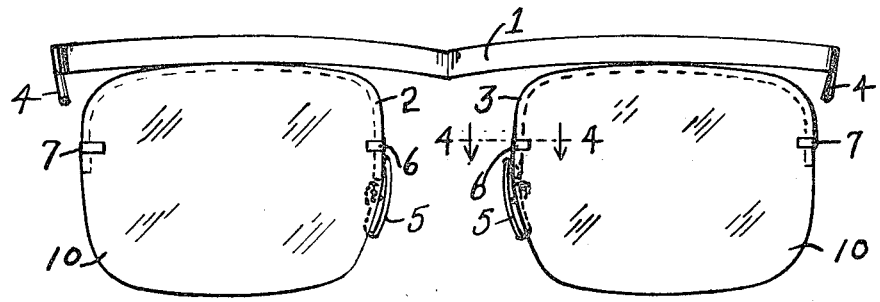
FIG. 1 is a plan view of a mounting embodying my invention.
Figures 2, 3:
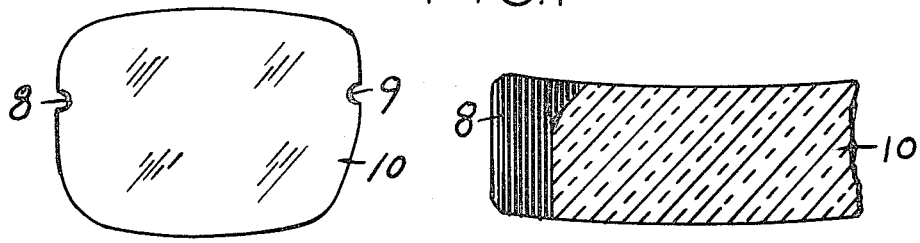
FIG. 2 is a plan view of the left side lens showing the formation of the notches therein.
FIG. 3 is a fragmentary sectional view of the lens showing the formation of the notch therein.
Figures 4, 5:
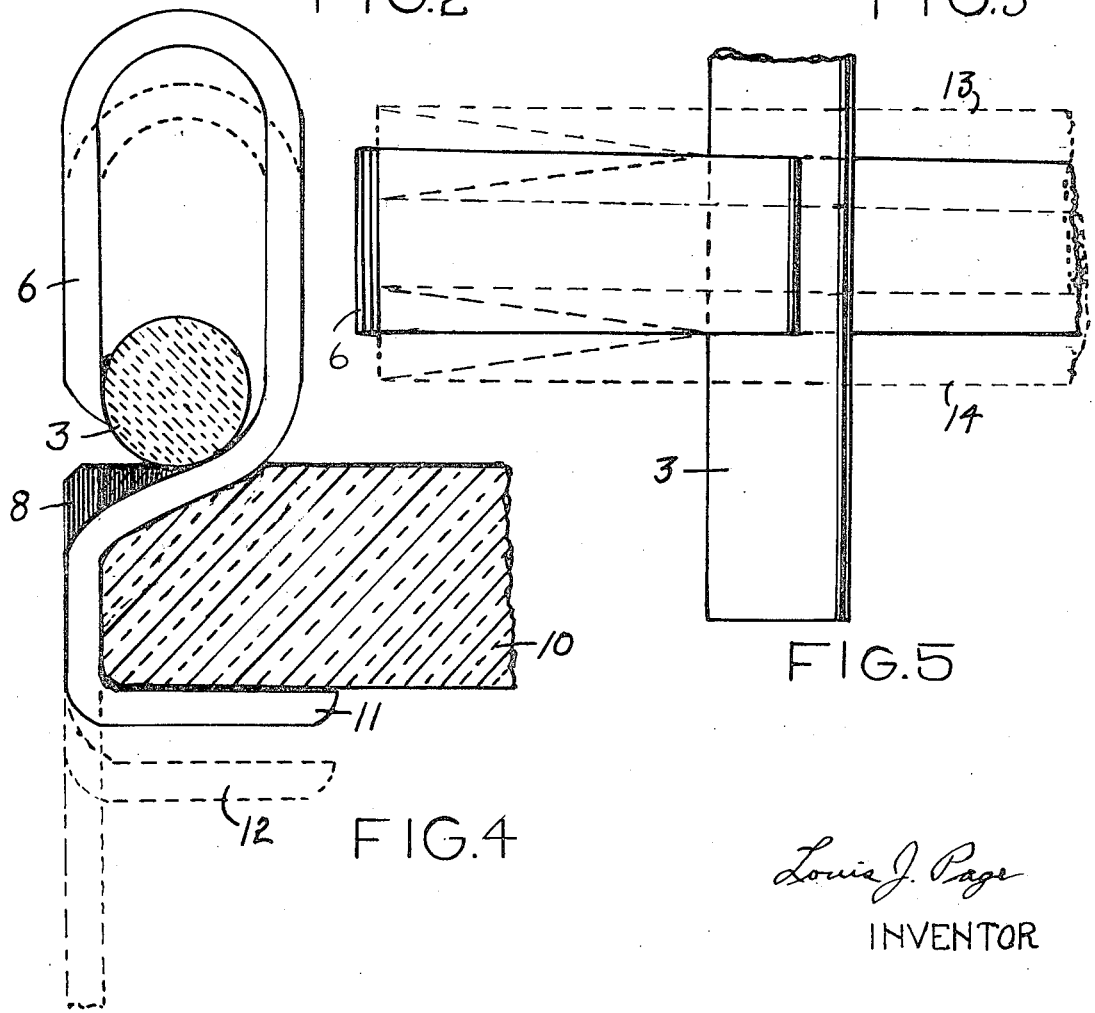
FIG. 4 is a fragmentary enlarged sectional view taken on line 4—4 of FIG. 1.
FIG. 5 is a fragmentary enlarged side view showing the arm in different positions relative to the supporting member.

Referring to the drawing the same numbers designate similar parts in the different views. In FIG. 1, the brow member 1 connects a pair of spaced resilient rim members 2 and 3. A pair of temples 4 are attached to the temporal side portions of the brow member 1 in the usual manner. A pair of nose pads 5 are attached to the nasal side portions of the rim members 2 and 3 in the usual manner. Each of the rim members is provided with bendable arms 6 and 7 which are arranged to engage in notches 8 and 9 formed in the nasal and temporal side edge portions of the lenses 10 respectively. The arms 6 and 7 are supplied to the optician long enough to accommodate the thickest lenses usually encountered in practice. The rim members 2 and 3 are formed so that the temporal and nasal side portions thereof tensionally hold the arms 6 and 7 in the notches 8 and 9 in the lens 10. The arm 6 is attached to the side portion of the rim member 3 and directed rearwardly and then redirected forwardly in a gooseneck formation as shown in FIG. 4. The arm 6 is supplied to the optician having the forward portion thereof extending forwardly of the front surface of the lens and is bent over to engage the front surface of the lens as shown in FIG. 4 at 11. The arm 6 is then cut off so that only the desired amount overlies the front surface of the lens. Should the optician incorrectly bend the arm 6 over at an angle so that the lens 10 is too thick to be assembled thereto, the loop portion of the arm 6 can be reworked with a plier by the optician and bent to move the portion 11 of the arm 6 which engages the front surface of the lens 10 forwardly as shown by the dash lines 12 in FIG. 4. Similarly the arm 6 can be reworked so that the portion 12 can be positioned closer to the rim member 3 should the lens be thinner than the space between the portion 12 of the arm 6 and the rim member 3. Should the lens be incorrectly notched so that the top of the rim member 3 extends above or below the corresponding edge portion of the lens 10, the arm 6 can be bent with a plier whereby the portion of the arm 6 engaging the notch in the lens is raised or lowered as shown by the dash lines 13 and 14 in FIG. 5 to compensate for the incorrect positioning of the notches in the lens so that the top surface of the rim member 3 is in substantial transverse alignment with the corresponding edge portion of the lens 10. Should the notch in the lens be made too deep so that the rim member 3 lies within the side edge portion of the lens, the arm 6 can be plier bent inwardly (toward the center of the lens) to compensate for this error whereby the finished eyeglasses have a better appearance. In FIG. 3 is shown the preferred arrangement of the notch 8 in the lens 10. The notch 8 is deeper at the rear surface of the lens than at the front surface thereof. This arrangement of the notch in the lens allows for the gooseneck bend in the arm 6.

Applicant wishes to point out that my device can be made having a gooseneck arm on only one side of the rim member and an arm which extends directly forwardly from the rim member on the other side portion thereof. In this form the rim member can still be adjusted vertically relative to the top edge portion of the lens since the relative distance between the arms 6 and 7 can be altered by plier bending the gooseneck arm up or down. My invention can also be applied to mountings having more than two arms such as the mounting shown in my patent application Ser. No. 876,445 now Pat. No. 3,610,742. In addition applicant wishes to point out that the arms 6 and 7 can extend rearwardly from the rim member and be redirected forwardly on the same side of the rim member 3 in the form of a loop or the arms can be attached to the inside surface of the rim member instead of the outside surface of the rim member as shown in the drawing.

Another modification of my invention is to have the rim member relatively rigid and the arms relatively resilient whereby the arms are tensionally held in the notches by the spring tension of the arms. In this form the portion of the arms opposite to the portion attached to the rim member is spaced from the adjacent portion of the rim mem- in its normal state and is tensionally forced toward the rim member when the lenses are attached thereto.

In the several views and specification applicant has shown and described different arrangements of his invention and does not limit himself to these applications. It is understood that other modifications of his invention might be conceived embodying the general principles of this invention. From the foregoing and accompanying drawing it is apparent that I have provided an ophthalmic mounting in accordance with the objects of my invention.

I claim:

1. An ophthalmic mounting comprising a pair of spaced tension rim members connected by a bridge member, each of said rim members being formed so as to extend partially along the periphery of a lens, a pair of lenses, said lenses being positioned against the front surface of said rim members, each of said him members having means tensionally engaging notches formed in the side edges of said lens, at least one of said means comprising an arm secured at one end to said rim member, said arm having a portion extending rearwardly from said rim member followed by a curved U-shaped portion followed by a portion extending forwardly past said rim member, the forward end portion of said arm being bent over at an angle to engage the front surface of said lens, the arm being plier bendable in all directions whereby the position of the lenses relative to the rim members can be adjusted.

2. An ophthalmic mounting as set forth in claim 1, at least one of the notches formed in the side edge of said lenses being substantially deeper at the rear surface than at the front surface.

3. An ophthalmic mounting comprising a pair of spaced rim members connected by a bridge member, each of said rim members being formed so as to extend partially along the periphery of a lens, a lens, said lens being positioned against the front surface of said rim member, each of said rim members having means tensionally engaging notches formed in the side edges of said lens, said means comprising a resilient arm secured at one end to said rim member, said arm having a portion extending rearwardly from said rim member followed by a curved U-shaped portion followed by a portion extending forwardly past said rim forming a loop, said arm being arranged to spring radially relative to said rim member so that said arm tensionally engages the notch in said lens, whereby said lens is tensionally secured to said rim member by said resilient arm.

References Cited
UNITED STATES PATENTS

| | | | |
|---|---|---|---|
| 2,557,321 | 6/1951 | Stegeman | 351—106 |
| 2,456,293 | 12/1948 | Markell | 351—106 |
| 2,588,505 | 3/1952 | Ellis | 351—106 |
| 2,243,681 | 5/1941 | Pomeranz | 351—107 |

DAVID SCHONBERG, Primary Examiner

J. W. LEONARD, Assistant Examiner

U.S. Cl. X.R.

351—107, 108, 148